United States Patent [19]

Salihar et al.

[11] Patent Number: 4,629,603

[45] Date of Patent: Dec. 16, 1986

[54] METHOD OF INHIBITING COLD END CORROSION IN BOILERS

[75] Inventors: Mark W. Salihar, Berwyn, Ill.; Gary G. Engstrom, Kenosha, Wis.; Donald P. Gauwitz, McHenry, Ill.

[73] Assignee: W. R. Grace & Co., New York, N.Y.

[21] Appl. No.: 677,157

[22] Filed: Dec. 3, 1984

[51] Int. Cl.$^4$ .................. C23F 11/00; C23F 11/02
[52] U.S. Cl. ........................... 422/9; 110/343; 110/348; 252/389.4; 252/389.41; 423/242; 423/243; 423/269; 423/271
[58] Field of Search ........... 422/9; 423/242 A, 242 R, 423/269, 243, 271, 265, DIG. 8; 252/192, 387, 389.4, 389.41, 389.62; 110/343, 348

[56] References Cited

U.S. PATENT DOCUMENTS

| | | |
|---|---|---|
| 1,157,436 | 10/1915 | Spence et al. . |
| 2,345,134 | 3/1944 | Lindsay et al. . |
| 2,513,131 | 6/1950 | Baer .................. 252/389.4 |
| 2,749,316 | 6/1956 | Coates . |
| 3,039,970 | 6/1962 | Krueger ................ 252/389.4 |
| 3,160,474 | 12/1964 | Schnoor et al. ........ 423/271 |
| 3,306,235 | 2/1967 | Lewis et al. ........... 110/1 |
| 3,886,261 | 5/1975 | Libutti . |
| 4,057,398 | 11/1977 | Bennett et al. ......... 44/4 |
| 4,100,258 | 7/1978 | Vossos et al. ......... 423/242 |
| 4,134,727 | 1/1979 | Oschell et al. . |
| 4,134,729 | 1/1979 | Libutti et al. . |
| 4,140,750 | 2/1979 | Oschell . |
| 4,298,497 | 11/1981 | Colombo ............... 422/9 |
| 4,377,557 | 3/1983 | Lowell . |
| 4,385,039 | 5/1983 | Lowell et al. . |

FOREIGN PATENT DOCUMENTS

| | | | |
|---|---|---|---|
| 467499 | 8/1950 | Canada ................. 423/271 |
| 467500 | 8/1950 | Canada ................. 423/271 |
| 1176033 | 10/1984 | Canada . |
| 39786 | 3/1983 | Japan .................. 252/389.4 |
| 822314 | 10/1959 | United Kingdom . |
| 922707 | 4/1963 | United Kingdom ....... 252/389.4 |

*Primary Examiner*—David L. Lacey
*Assistant Examiner*—W. R. Johnson
*Attorney, Agent, or Firm*—David E. Heiser; William W. McDowell, Jr.

[57] ABSTRACT

A liquid borate is added to sulfur trioxide-containing combustion gases at a temperature of from about 250° to about 1000° F. in a boiler or other furnace system. The borate neutralizes sulfuric acid in the gases and inhibits sulfuric acid corrosion and deposition on metal surfaces of the system that contact the gases. An organic deposit modifying agent such as sorbitol and an additional acid neutralizing agent such as an alkali metal hydroxide, aluminate, or silicate may also be added to the combustion gases.

12 Claims, No Drawings

METHOD OF INHIBITING COLD END CORROSION IN BOILERS

This invention relates to the neutralization of sulfuric acid in furnace combustion gases and inhibition of corrosion and fouling of metal surfaces that come in contact with the gases.

Combustion of sulfur-containing fuels such as coal and residual oil in boilers and other furnace systems generates sulfur trioxide-containing gases. Release of the sulfur trioxide to the atmosphere can cause air pollution. Sulfur trioxide also combines with water vapor in the combustion gases to form sulfuric acid and the sulfuric acid can deposit on metal surfaces in the system. These acid deposits cause corrosion and fouling that interfere with gas flow and reduce heat transfer efficiency.

In a typical electric power generating boiler system, the hot gases produced in the combustion chamber of the furnace flow over boiler tubes that are positioned in the radiant heating section of the furnace and contain the water to be converted to steam. The gases then flow in sequence from the combustion zone and steam generator zone through the steam heater, economizer, and air preheater zones. These additional heat recovery devices are positioned in the flue through which the gases pass after leaving the combustion chamber in order to maximize the utilization of combustion gas heat. The steam heater zone contains the superheaters and/or the reheaters. The superheaters heat steam generated in the boiler tubes and the superheated steam is fed to the turbine. In boiler systems with multiple stage turbines, the reheaters heat partially expanded steam withdrawn from the high pressure stages of the turbine and the reheated steam is used to drive the lower pressure stages of the turbine. After passing through the superheaters and/or reheaters, the combustion gases flow through the economizer where the feedwater to the boiler tubes is preheated. The air preheater is located downstream from the economizer in the flow path of the combustion gases and increases the temperature of the air feeding the combustion system and thus the overall efficiency of the boiler. The gases then flow through the precipitator where solids are removed and then up the stack.

The combustion gases cool to progressively lower temperatures as they flow through the heat recovery devices in the boiler system. The gas temperature is 2500° to 3500° F. in the flame section of the combustion chamber and 2000° to 2500° F. in the radiant heating section. The gas temperature is 1000° to 1600° F. after passage through the superheaters and/or reheaters and 500° to 750° F. after passage through the economizer. The gas temperature after the gases pass through the air preheater is 250° to 350° F. The cold end of a boiler system is the path that the combustion gases follow through the economizer, air preheater, precipitator, and stack after the gases have performed the functions of heating water, producing steam, and superheating and reheating steam in the boiler tubes, superheaters, and reheaters.

Sulfuric acid condenses onto metal surfaces at the cold end where the flue gas temperature falls below the condensation temperature or dew point of the acid vapor. The acid dew point depends upon the relative proportions of acid and water vapor that are present in the combustion gases and varies from 280° to 320° F. under normal operating conditions. The metal temperatures fall below the dew point of the acid vapors at or after the air preheater and the most noticeable sulfuric acid corrosion and fouling generally occur in the air preheater and subsequent stages.

Various neutralizing additives have been used in boiler flue gases. In British Pat. No. 822,314, alkali metal compounds such as sodium or potassium hydroxide are injected after the combustion chamber of a boiler to reduce the acid content of the flue gases and prevent corrosion of metal surfaces such as economizers and air heaters. U.S. Pat. Nos. 4,137,727 of Oschell et al. and 4,140,750 of Oschell describe cold end addition to boiler flue gases of sodium metasilicate and its combinations with other materials to reduce the sulfur trioxide content. In U.S. Pat. No. 4,100,258 of Vossos et al., 4,134,729 of Libutti et al., and 4,298,497 of Columbo, sodium aluminate and its combinations with other materials are used as neutralizing agents to remove sulfur trioxide from flue gases in the cold end of a boiler.

U.S. Pat. No. 3,306,235 of Lewis et al. describes the use of a solid borate as a furnace additive. According to Lewis et al., a dry mixture of sodium tetraborate and one or more conventional furnace additives such as alkaline earth metal oxides is introduced into a steam generating furnace to reduce tube corrosion and deposits. The presence of the sodium tetraborate increases and adherence of the additives to the heat transfer surfaces without impairing the beneficial effect of the additive itself. The mixture is introduced into the furnace at locations which will give adequate and relatively uniform coverage of the superheater and reheater tubes.

The present invention provides a method of reducing corrosion and fouling of metal surfaces in contact with sulfur trioxide-containing combustion gases in a furnace system. In the method, a liquid borate is added to the gases at a temperature of from about 250° to about 1,000° F. in an amount effective to reduce corrosion and fouling. The method surprisingly provides unexpectedly effective neutralization of the acidic combustion gases. The solids formed on evaporation of the liquid borate in the system have a high surface area so that acid neutralization is enhanced and high friability so that deposits on metal surfaces are easily removed.

The liquid borate used in the present invention is generally an aqueous solution of a water soluble borate. Suitable water soluble borates include various borates such as alkali metal and ammonium metaborates and tetraborates. Sodium tetraborate in the commercially available decahydrate form is preferred because its evaporated solids generally have a higher surface area and friability.

One or more conventional cold end liquid neutralizing agents such as an aqueous solution of a water soluble sodium or other alkali metal hydroxide, aluminate, or silicate may be used in combination with the borate in order to increase the acid neutralization capacity. An alkali metal hydroxide such as sodium hydroxide is particularly preferred because of its high alkalinity and its combination with the borate provides superior neutralization without the adherent sodium hydroxide deposits that may occur when sodium hydroxide is used without borate.

In order to increase further the acid neutralization capacity of the borate and the friability of the deposits, a liquid organic deposit modifying agent may also be added to the combustion gases. These deposit modifying agents result in solids that have more surface area for acid neutralization and that are more friable and less adherent to the metal surfaces in the furnace system. The resulting deposits are more easily removed by the application of compressed air which is conventionally employed to clean metal surfaces in furnace systems. Suitable organic deposit modifying agents have a gas generation temperature, i.e., a temperature at which they evaporate and/or decompose to produce a gas, of generally about 250° to about 1000° F. and preferably of about 350° to about 650° F. so that they generate a gas at the temperatures they encounter in the furnace system. The gas generation results in more rapid and complete drying and a solid material of higher surface area and friability. Suitable organic materials include aqueous solutions of water soluble alcohols, for example, water soluble aliphatic alcohols having 1 to 10 carbon atoms such as sorbitol, methanol, ethanol, ethylene glycol, proplyene glycol, and glycerol; water soluble sugars such as fructose or glucose; and urea. Sorbitol is preferred.

The liquid cold end additive in the form of an aqueous solution generally comprises from about 1 to about 30 weight percent and preferably from about 5 to about 25 weight percent of the borate, generally from about 1 to about 50 weight percent and preferably from about 5 to about 35 weight percent of the additional neutralizing agent, generally from about 1 to about 10 weight percent and preferably from about 1 to about 5 weight percent of the organic deposit modifying agent, and the balance water as the solvent. Mixtures of these components may be prepared by blending solid materials and dissolving the mixture but blending solutions is generally more convenient.

The liquid additive may be introduced into the furnace in a variety of ways that provide effective contact of the additive with the acid gases. Generally, the additive is sprayed into the combustion gases upstream of the metal surfaces to be treated or directly into the gases as they contact the surfaces. The additive may be introduced by the use of a sonic feed nozzle or other liquid atomizer nozzle. At the point of addition, the temperature of the combustion gases is from about 250° to about 1000° F. and is preferably from about 350° to about 650° F. Although addition may be made downstream of the superheaters and reheaters and upstream of the economizer, the addition is typically made upstream of the air preheated and downstream of the encomizer because the more severe corrosion and fouling problems occur in the air preheater and subsequent stages.

The amount of the borate or of the borate and additional neutralizing agent and/or organic deposit modifying agent additive which is effective to reduce corrosion and fouling may vary widely since corrosion and fouling depend upon the nature of the fuel, the way in which it is burned, and the size of the furnace. Generally, the amount may range from about 0.05 to about 1.5 pounds of additive (dry basis) per pound of sulfur trioxide present in the combustion gases.

EXAMPLES

A aqueous solution containing 20 weight percent sodium tetraborate and 5 weight percent sodium hydroxide was prepared and tested as an air preheater corrosion and fouling inhibitor in an industrial boiler. The boiler burned a pulverized five weight percent sulfur eastern coal and produced five hundred thousand pounds of steam per hour nominal design capacity. The tetraborate and hydroxide solution was injected at a point in the duct twenty five feet prior to the air preheater where the flue gas stream temperature was in the range of 550° to 750° F. The additive was tested at five dosage rates ranging from 0.5 to 4.0 pounds per ton of coal burned. The acid dew points of the flue gases were measured without treatment and at the five dosage rates. Acid dew point decreases when the sulfuric acid content of the gases decreases. The ppm amounts of sulfur trioxide that are equivalent to the measured dew points were determined for eight percent flue gas moisture from the Abel and Greenewalt curve. The results are shown in the following table.

| Rate (pound/ton) | Acid Dew Point (°F.) | $SO_3$ (ppm) |
|---|---|---|
| 0 | 278–290 | 18–40 |
| 0.5 | 275–285 | 14–28 |
| 1.0 | 272–276 | 12–16 |
| 1.5 | 268–273 | 8–13 |
| 2.5 | 265–268 | 6–8 |
| 4.0 | 255–264 | 3–6 |

The additive of the present invention reduced the acid dew point by 12° F. from the untreated dewpoint at a 1.5 pound per ton dosage level and by 18° F. at a 2.5 pound per ton dosage level. The 12° F. and 18° F. reductions respectively correspond to sulfur trioxide concentration reductions of 8 and 6 ppm.

The effectiveness of the additive was also evaluated by collecting samples of fly ash deposits from the air preheater tubes and measuring the pH of one weight percent slurries of the fly ash in distilled water. The fly ash slurry pH indicates the amount of sulfuric acid deposits on the tubes. A one percent slurry of ash treated with the additive had a pH of 3.00 which is equivalent to 0.0010 gram-ions per liter. A one percent slurry of untreated ash had a pH of 2.18 which is equivalent to 0.0066 gram-ions per liter. Thus, treatment at 1.5 pounds per ton resulted in a six times lower free hydrogen ion concentration in the fly ash particulate.

The results demonstrate the unique ability of the borate solution to neutralize sulfuric acid in furnace combustion gases.

We claim:

1. In a method of reducing corrosion and inhibiting fouling of metal surfaces in contact with sulfur trioxide-containing combustion gases in a furnace system by adding at least one liquid acid gas neutralizing agent, the improvement comprising a step of adding a liquid borate to the combustion gases which are at a temperature of about 250° to about 1000° F. as the at least one acid gas neutralizing agent in an amount effective to form, upon evaporation of the at least one liquid acid gas neutralizing agent added, solids which are friable so that any deposit thereof on said metal surfaces can be easily removed.

2. The method of claim 1 in which the improvement includes adding the borate to the combustion gases which are at a temperature of about 350° F. to about 650° F.

3. The method of claim 1 in which the furnace system is a boiler system having a steam heater, an economizer, and an air preheater through which the gases flow in sequence and the borate is added to the gases downstream of the economizer and upstream of the air preheater.

4. The method of claim 1 in which the improvement includes adding the borate in an amount of from about 0.05 to about 1.5 pounds per pound of sulfur trioxide present in the gases.

5. The method of claim 1 in which the improvement includes adding as the liquid borate an aqueous solution of sodium tetraborate.

6. The method of claim 1 in which an additional liquid acid gas neutralizing agent is added to the gases.

7. The method of claim 6 in which the aldditional acid gas neutralizing agent is an aqueous solution of sodium hydroxide.

8. The method of claim 1 in which the improvement further comprises adding together with the borate a liquid organic deposit modifying agent having a gas generation temperature of about 250° to about 1000° F. to the combustion gases which are at a temperature between the gas generation temperature of the organic deposit modifying agent and about 1000° F. so that additional gas is generated during evaporation to reduce the adherence of solids to the metal surfaces.

9. The method of claim 8 in which the improvement includes adding as the organic deposit modifying agent an aqueous solution of an alcohol, a sugar, or urea.

10. The method of claim 8 in which the improvement includes adding as the organic deposit modifying agent an aqueous solution of sorbitol.

11. The method of claim 8 in which the improvement includes adding the at least one liquid acid neutralizing agent and the liquid organic deposit modifying agent to the combustion gases as an aqueous solution which comprises from about 1 to about 30 weight percent of the borate, from about 1 to about 10 weight percent of the organic deposit modifying agent, and from about 1 to about 50 weight percent of an additional acid gas neutralizing agent.

12. In a method of reducing corrosion and inhibiting fouling of metal surfaces in contact with sulfur trioxide-containing combustion gases flowing from a combustion chamber in which sulfur-containing fuel is burned, in sequence through a steam generator, a steam heater, an economizer, and an air preheater in a steam generating boiler system using sodium hydroxide as an acid gas neutralizing agent, the improvement comprising the step of spraying at a location downstream of the economizer and upstream of the preheater, from about 0.5 to about 4.0 pounds of a liquid additive per 100 pounds of sulfur in the fuel, said additive comprising an aqueous mixture of from about 5 to about 35 weight percent of said sodium hydroxide, along with from about 5 to about 25 weight percent sodium tetraborate as another acid gas neutralizing agent and from about 1 to about 5 percent sorbitol, into the combustion gases which are at a temperature of at least the gas generation temperature of sorbitol, the sorbitol and the sodium tetraborate being incorporated in amounts effective to generate gas from the sorbitol during evaporation of the additive, to reduce the adherence of solids to the metal surfaces, and to form, upon evaporation of the additive, solids which are friable so that deposits thereof on the metal surfaces can be easily removed by the application of compressed air.

* * * * *